United States Patent [19]

Tornatore et al.

[11] 4,371,828
[45] Feb. 1, 1983

[54] AUTONOMOUS ELECTRICAL POWER GENERATOR

[75] Inventors: Giovanni Tornatore, San Benigno Canavese; Lorenzo Bogetti, Piobesi Torinese, both of Italy

[73] Assignee: Fiat Auto S.p.A., Turin, Italy

[21] Appl. No.: 257,843

[22] Filed: Apr. 28, 1981

[30] Foreign Application Priority Data

May 5, 1980 [IT] Italy .............................. 67698 A/80

[51] Int. Cl.³ .................... H02K 11/00; H02P 9/04
[52] U.S. Cl. ........................... 322/32; 322/58; 322/96
[58] Field of Search ............. 322/20, 32, 35, 58, 322/89, 90, 95, 96, 76

[56] References Cited

U.S. PATENT DOCUMENTS

| 1,376,400 | 5/1921 | Chubb | 322/58 |
|---|---|---|---|
| 1,376,425 | 5/1921 | Fortescue | 322/58 |
| 1,387,469 | 8/1921 | Chubb | 322/58 X |
| 2,409,213 | 10/1946 | Kilgore | 322/96 X |
| 2,758,272 | 8/1956 | Franklin | 322/96 X |
| 2,869,066 | 1/1959 | Lutz | 322/76 X |
| 3,043,115 | 7/1962 | Harter | 322/96 X |
| 4,242,628 | 12/1980 | Mohan | 322/35 |

OTHER PUBLICATIONS

Frank, H. and Landstrom, B., "Power Factor Correction with Thyristor-Controlled Capacitors", ASEA Journal, vol. 44, #6, 1971, (pp. 3-7).

*Primary Examiner*—R. J. Hickey
*Attorney, Agent, or Firm*—Sughrue, Mion, Zinn, Macpeak & Seas

[57] ABSTRACT

A generator set includes a prime mover and a three-phase asynchronous electrical machine coupled to this prime mover and acting as a generator. In addition, at least one set of three delta-connected excitation capacitors is provided, the vertices of the delta-connection each being connected to a respective phase of the electrical machine. A respective inductor is connected in series with each of the said capacitors so as to form at least one set of three L-C series resonators. The resonant frequency of the or each set of resonators is substantially equal to a corresponding predetermined odd harmonic of the frequency of the voltage delivered by the generator. In parallel with each phase of the electrical machine there is also connected a saturable reactor acting as a voltage regulator.

5 Claims, 1 Drawing Figure

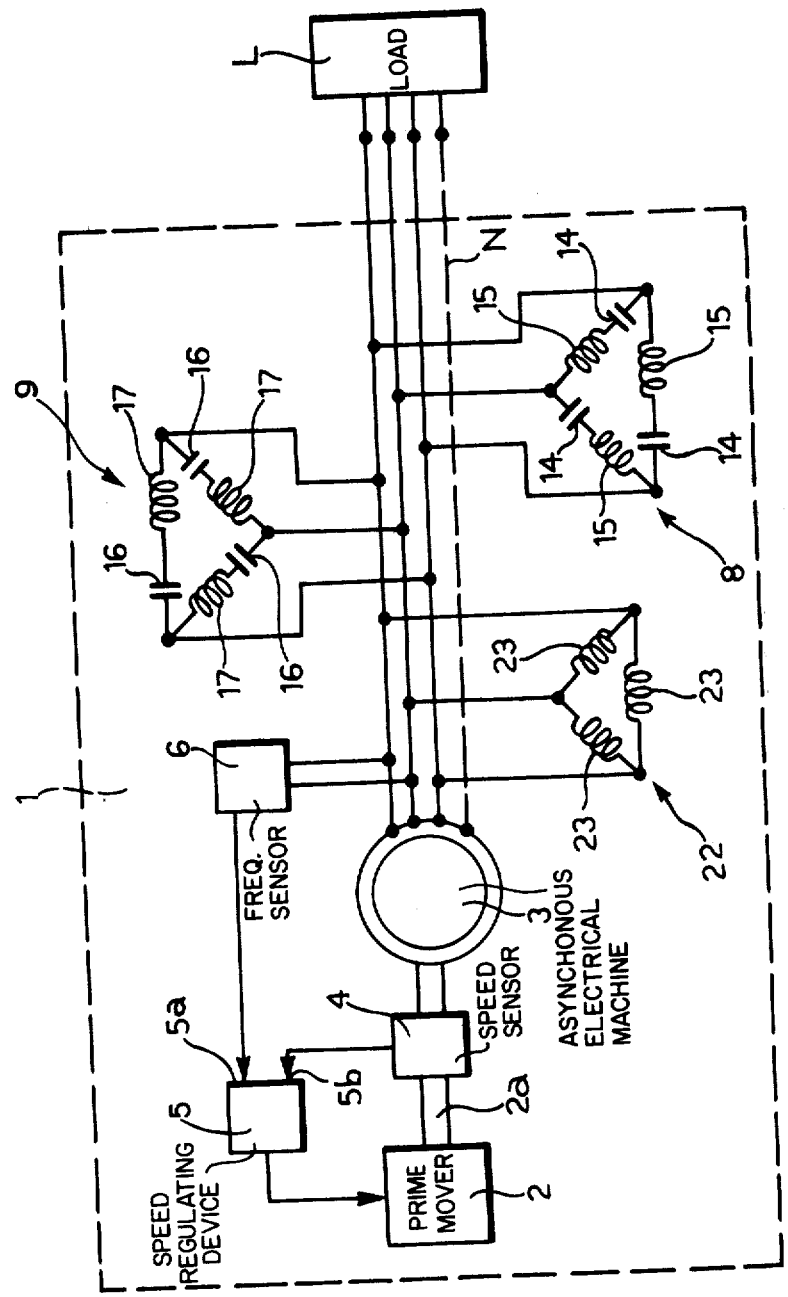

AUTONOMOUS ELECTRICAL POWER GENERATOR

The present invention relates to an autonomous electrical power generator of the type including a prime mover and a three-phase asynchronous electrical machine coupled to the prime mover and acting, in use, as a generator.

It is known that an asynchronous electrical machine may act as a generator and hence supply real electrical power provided that it has an external supply of the reactive power necessary to create the field.

When an asynchronous electrical generator is connected in parallel with an existing network the reactive power necessary to create the field in the asynchronous machine is provided by the network itself.

The object of the present invention is to provide an electrical generator of the type specified above which is able to act as an autonomous generator without connection to an existing supply network.

In order to achieve this object, the present invention provides an autonomous electrical power generator including a prime mover and a three-phase asynchronous electrical machine coupled to the prime mover and acting, in use, as a generator, the main characteristic of which lies in the fact that it further includes:

at least one set of three delta-connected capacitors, the vertices of this delta-connection each being connected to a respective phase of the said electrical machine; the capacitance of the said capacitors having a value such that in operation, the capacitors together with the windings of the said electrical machine, constitute three circuits resonant at the frequency corresponding to the speed of rotation of the rotor; an inductor being connected in series with each of the said capacitors so as to constitute at least one set of three L-C series resonators; the inductance of the inductors in each set of three resonators having a value such that the frequency of resonance of the resonators in each set of three is substantially equal to a predetermined odd harmonic of the frequency of the voltage supplied in use by the said electrical machine, and a set of three delta-connected saturable reactors, the vertices of the delta connection each being connected to a respective phase of the said electrical machine.

Further characteristics and advantages of the present invention will become apparent from the detailed description which follows with reference to the appended drawing, provided purely by way of non-limiting example, in which a circuit diagram of an autonomous electrical power generator is shown partially in block form.

As shown in the said drawing, the autonomous electrical generator according to the present invention, indicated in its entirety by 1, includes a prime mover 2 constituted, for example, by an internal combustion engine, and a three-phase asynchronous electrical machine 3 coupled to the said prime mover 2.

The windings of this asynchronous electrical machine 3 may be delta- or start-connected. In the latter case a "neutral" wire N may be connected to the centre of the star and to the load.

By 4 is indicated a speed sensor which, in use is arranged to monitor the instantaneous speed of rotation of the shaft 2a of the prime mover 2 and to provide at its output an electrical signal indicative of this speed. A device for regulating the speed of the prime mover 2 is indicated by 5.

By 6 is indicated a frequency sensor connected in parallel with the output terminals of one phase of the three-phase asynchronous electrical machine 3. The output of this frequency sensor 6 is connected to a first input 5a of the regulating device 5, the output of the speed sensor 4 being connected to a second input 5b thereof.

References 8, 9 respectively indicate two sets of three delta-connected, L-C series resonant circuits the vertices of the delta connection each being connected to the output terminal of a respective phase of the asynchronous electrical induction machine 3.

The capacitors common to a set of three each have the same capacitance. Similarly, the inductors, common to a set of three resonant circuits each have the same inductance.

The capacitors of the sets of three resonant circuits indicated by 8, 9 are indicated by 14, 16 respectively.

The inductors of the sets of three resonant circuits indicated by 8, 9, respectively, are indicated by 15, 16 respectively.

The capacitors 14, 16 are connected subtstantially in parallel with the windings of the three-phase asynchronous electrical machine. The total capacitance resulting from the connection of the said capacitors in parallel must be such that in use, all these capacitors, together with the windings of the electrical machine 3, constitute three circuits resonating at a frequency corresponding to the speed of rotation of the rotor. The said capacitors, in operation, provide the electrical machine 3 with the reactive power needed for its operation and hence constitute the excitation system of the asynchronous machine 3.

It is known that, in operation, the inductance presented by the asynchronous electrical machine 3 varies with variations in the current supplied. Consequently, on variation of the load, the resonance conditions of the resonant circuit constituted by the said capacitors and by the asynchronous electrical machine 3 vary, and this variation, as is known, results in a variation in the modulus of the voltage generated.

It is also necessary to take into account the fact that the load L is usually constituted by loads the impedances of which have an inductive reactive component. Consequently the equivalent inductance in parallel with the said capacitors clearly varies further on variation of the load L. This results in a further modification of the resonance conditions of the system described above, and consequently a further variation in the modulus of the voltage generated.

In order to limit these variations of the modulus of the voltage generated, both on changing from operation without load to operation with load, and on variation of the load L itself, it is necessary to provide the autonomous generator 1 with a regulating system which compensates for the above-described variations in inductances which occur both as a result of the nature of the asynchronous machine 3 itself and as a result of variations in the load. For this purpose, according to the invention, a set 22 of three delta-connected saturable reactors 23 is provided, the vertices of the delta-connection each being connected to a respective phase of the asynchronous electrical machine 3.

Each saturable reactor 23 is constituted by an inductor provided with a core formed from lamina of magnetic material with aligned crystals. These saturable reactors 23 are designed to operate, during use, always under conditions of saturation, that is to say in correspondence with the portions of their characteristic magnetisation curves in which a considerable variation in the magnetising current corresponds to very small variations in the modulus of the voltage applied thereto.

The set 22 of three saturable reactors 23 has the function of a true voltage regulator, and allows the variations in voltage to be limited to a very narrow range.

Since, as is known, saturable core reactors have magnetisation characteristics with a significantly non-linear behaviour, it follows that by applying a voltage to these reactors which has a sinusoidal waveform, the resulting current flow is greatly distorted, and in particular this current contains substantial odd harmonic component.

The Applicant has found that the odd harmonics of greatest weight in the waveform of the said current are the third, fifth, seventh, ninth harmonics.

The third and ninth harmonics do not interfere substantially with the asynchronous electrical machine 3, nor with the load L since these harmonics circulate only in the delta-connection 22 of the saturable reactors 23.

The presence of the fifth and seventh harmonics however results in a distortion of the waveform of the voltage supplied to the load L.

In order to reduce this distortion, the inductors 15 conveniently have inductance values such that they constitute, together with the capacitors 14, filters which resonate at the frequency of the fifth harmonic of the frequency of the voltage generated by the asynchronous electrical mahine 3.

Similarly, the inductors 17 each have an inductance value such that, together with their respective capacitor 16, they constitute filters which resonate at the seventh harmonic of the frequency of the voltage generated by the asynchronous electrical machine 3.

In operation without a load, the prime mover 2 rotates the asynchronous electrical machine 3, which is excited as a result of its residual magnetism and the reactive energy exchanged with the capacitors 14, 16.

In particular, in operation without a load, the machine 3 is brought into operation at the point of intersection of the excitation characteristic of the machine and the characteristic of the bank of capacitors, thus generating a voltage having a frequency dependent on the speed at which the rotor is rotated.

The operation of the asynchronous electrical machine under load, as is known, varies according to the behaviour of the prime mover. In fact, since a flow of power from the rotor to the stator of the asynchronous machine 3 is possible, the rotor must assume a speed greater than that of the rotating field in the air gap. Now, if the prime mover 2 were to maintain a constant speed on variation of the load L, the frequency of the voltage generated by the asynchronous electrical machine 3 would diminish as a consequence. Therefore, to maintain the frequency of the voltage generated substantially constant, the prime mover 2 must increase its speed with an increase in the load L. For this purpose, in operation, the speed sensor 6 monitors the instantaneous value of the frequency of the voltage generated and accordingly acts on the speed regulating device 5 of the prime mover 2 such that the frequency of generation is maintained substantially constant.

Naturally, the principle of the invention remaining the same, the embodiments and the details of realisation may be varied widely with respect to what has been described and illustrated purely by way of non-limiting example, without thereby departing from the scope of the present invention.

We claim:

1. An autonomous electrical power generator comprising a prime mover, a three-phase asynchronous electrical machine coupled to said prime mover and acting, in use, as a generator, at least one set of three delta-connected capacitors, the vertices of this delta-connection each being connected to a respective phase of the said electrical machine; the capacitance values of said capacitors being such that, in operation, the said capacitors constitute together with the said windings of the electrical machine, three circuits resonating at a frequency corresponding to the speed of rotation of the machine, respective inductors connected in series with the capacitors of the said at least one set of capacitors so as to form therewith at least one set of three L-C series resonators; the inductance values of said inductors being such that the resonant frequency of the resonators of each of the said at least one set of resonators is substantially equal to a corresponding predetermined odd harmonic of the frequency of the voltage supplied, in use, by the said electrical machine, and, a set of three delta-connected saturable reactors, the vertices of this delta-connection each being connected to a respective phase of said electrical machine.

2. An autonomous electrical power generator according to claim 1, wherein there are provided two said sets of delta-connected capacitors, each said capacitor being connected in series with a respective said inductor so as to constitute two said sets of three L-C series resonators; the resonant frequency of the said two sets of three resonators being respectively equal to the fifth and seventh harmonic frequencies of the frequency of the voltage supplied, in use, by the said asynchronous electrical machine.

3. An autonomous electrical power generator according to claim 1 or 2, wherein said prime mover is constituted by an internal combustion engine and the generator further includes:

a speed sensor for supplying, in use, at its output an electrical signal indicative of the speed or rotation of said prime mover, a device for regulating the speed of the prime mover, said device being connected to the said speed sensor, and a frequency sensor connected across one phase of said three-phase asynchronous electrical machine and having an output which is connected to the said speed-regulating device of the said prime mover.

4. An autonomous electrical power generator according to claim 1, wherein each of the said saturable reactors is constituted by an inductor provided with a core.

5. An autonomous electrical power generator according to claim 4, wherein the said core of each of the said saturable reactors is formed by lamina of magnetic material with aligned grains.

* * * * *